(12) United States Patent
Pursifull

(10) Patent No.: US 8,214,129 B2
(45) Date of Patent: Jul. 3, 2012

(54) DISTINGUISHING THE FUEL ADMITTED TO A FUEL SYSTEM

(75) Inventor: Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 677 days.

(21) Appl. No.: 12/465,504

(22) Filed: May 13, 2009

(65) Prior Publication Data

US 2010/0288367 A1 Nov. 18, 2010

(51) Int. Cl.
*G06F 19/00* (2011.01)
*G01N 31/00* (2006.01)
*F17D 3/00* (2006.01)

(52) U.S. Cl. ............... 701/103; 701/113; 702/23; 137/3

(58) Field of Classification Search .................. 123/1 A, 123/304, 491, 494, 525, 575, 576; 701/101–105, 701/113, 115, 123; 137/2–4; 141/94; 220/86.2; 73/61.41, 61.43; 340/450; 702/23, 25
See application file for complete search history.

(56) References Cited

U.S. PATENT DOCUMENTS

| 4,601,303 | A | * | 7/1986 | Jensen ............................... 137/3 |
| 4,677,567 | A | * | 6/1987 | Grosser et al. .................... 137/4 |
| 5,542,394 | A | | 8/1996 | Tomisawa |
| 6,708,502 | B1 | | 3/2004 | Aceves et al. |
| 7,000,654 | B1 | * | 2/2006 | Rossi ............................. 141/95 |
| 7,373,932 | B2 | | 5/2008 | Hayashi et al. |
| 7,693,651 | B2 | * | 4/2010 | Proefke et al. ................ 701/123 |
| 7,720,592 | B2 | * | 5/2010 | Leone et al. ................... 701/103 |
| 2007/0256737 | A1 | | 11/2007 | Janarthanam et al. |
| 2010/0126253 | A1 | * | 5/2010 | Rosel et al. .................. 73/61.43 |

* cited by examiner

*Primary Examiner* — Willis Wolfe, Jr.
(74) *Attorney, Agent, or Firm* — Allen J. Lippa; Alleman Hall McCoy Russell & Tuttle LLP

(57) ABSTRACT

A method for registering a content change in a fuel system of a motor vehicle, where the fuel system is configured to receive a first fuel and a second fuel into a common space. A first condition is correlated to receiving the first fuel, and a second condition is correlated to receiving the second fuel. The method comprises admitting fuel to the fuel system and indicating that the first fuel has been admitted if a condition responsive to admitting the fuel matches the first condition and does not match the second condition.

21 Claims, 6 Drawing Sheets

DISTINGUISHING THE FUEL ADMITTED TO A FUEL SYSTEM

TECHNICAL FIELD

The present application relates to the field of motor vehicles, and more particularly, to motor-vehicle fuel systems.

BACKGROUND AND SUMMARY

For various benefits, a fuel system of a motor vehicle may be configured to store a plurality of different fuels, either severally or as a mixture. In one example, a fuel system so configured may be installed in a motor vehicle whose engine is configured to consume either fuel A or fuel B, or a mixture of fuels A and B. In this example, the engine may adapt automatically to the fuel that is provided, or it may require some adjustment based on the fuel.

In another example, a vehicle may be assembled at least partly from component modules, some of which may be adaptable to different motor vehicles. For instance, two motor vehicles—one of them configured to consume fuel A and the other configured to consume fuel B—may each include a fuel system of substantially the same configuration. This approach may be taken in order to simplify motor-vehicle manufacture.

In the examples noted above, it may be beneficial for the fuel system to detect refueling and to further detect the type of fuel supplied during the refueling. Accordingly, U.S. Pat. No. 5,542,394 provides a refueling detection system and method for a motor-vehicle. This approach combines pressure-based refuel detection with a fuel-property (e.g., volatility) determination. The fuel-property determination relies on changing a fuel-injection amount provided to the engine of the motor vehicle and detecting a response of one or more engine parameters (e.g., combustion pressure). However, the inventors herein have identified various inadequacies of this approach.

For example, the indicated method of determining the fuel property may be acceptable only if it has been established that the fuel in the fuel tank is suitable for consumption by the engine under existing conditions of the engine. In some scenarios, however, the fuel in the fuel tank may be unsuitable for the engine under any circumstance, or, the engine may require some adjustment or adaptation from its current operating state in order to safely use the fuel. If, for any reason, the fuel in the fuel tank is not suitable for the engine, the indicated method of determining the fuel property may give unreliable results, or may cause degradation of engine components.

Therefore, in one embodiment, a method for registering a content change in a fuel system of a motor vehicle is provided. In this embodiment, the fuel system is configured to receive a first fuel and a second fuel into a common space. A first condition is correlated to receiving the first fuel, and a second condition is correlated to receiving the second fuel. The method comprises admitting fuel to the fuel system and indicating that the first fuel has been admitted if a condition responsive to admitting the fuel matches the first condition and does not match the second condition.

In another embodiment, a method is described for registering a content change in a fuel system of a motor vehicle, the method comprising: admitting fuel to the fuel system, the fuel system configured to receive hydrogen and compressed natural gas into a common space; indicating that compressed natural gas has been admitted if a temperature in the common space increases by more than a threshold amount when the fuel is admitted, said indicating occurring, if at all, before the compressed natural gas is consumed by an engine of the motor vehicle; indicating that hydrogen has been admitted if the temperature in the common spaces increases by less than the threshold amount when the fuel is admitted, said indicating occurring, if at all before the hydrogen is consumed by the engine of the motor vehicle; and adjusting a start-up operating parameter of the motor vehicle in response to which of said fuels is indicated to have been admitted.

Other embodiments provide more particular methods for registering a content change in the fuel system and for adjusting one or more start-up operating parameters of the motor vehicle based on the content of the fuel system.

In the methods described herein, various start-up operating parameters may be adjusted, such as fuel injection amount, injection timing, spark timing, etc. In this manner, an electronic control system of the motor vehicle may determine which fuel or fuels are present in the fuel system before providing any fuel to the engine, thereby enabling a reliable adjustment of the start-up operating parameter and avoiding the delivery of an inappropriate fuel to the engine. Further, the electronic control system may accommodate, yet distinguish between, two gaseous fuels and provide compensation for engine starting, including compensation for even the first combustion event (e.g., from engine rest) of the start.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
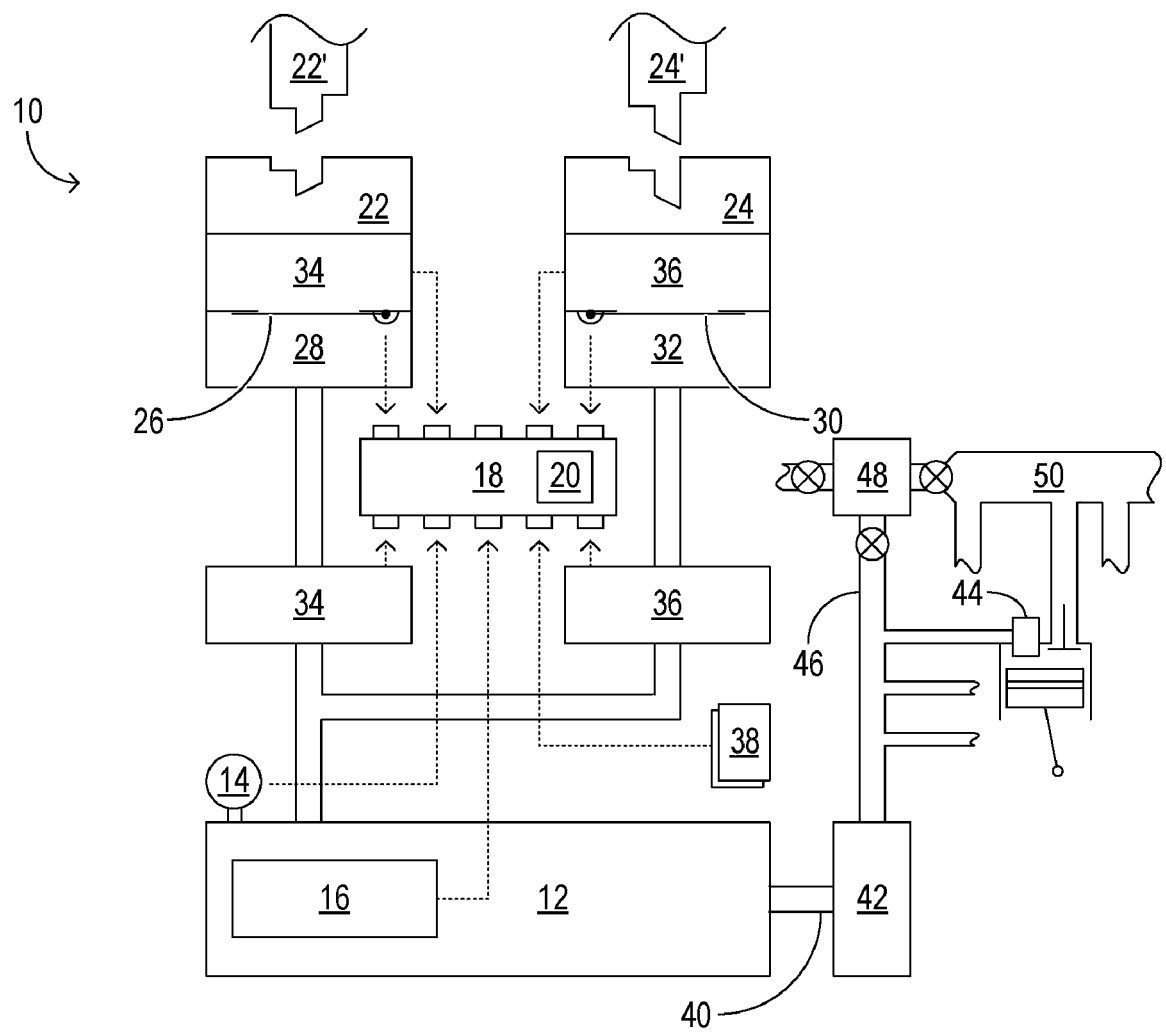
FIG. 1 schematically shows aspects of a first example fuel system configured to register a content change responsive to refueling, in accordance with the present disclosure.

FIG. 1 schematically shows aspects of a first example fuel system 10 configured to register a content change responsive to refueling. The fuel system may be installed in a motor vehicle (not shown in the drawings). The fuel system includes fuel tank 12, which may be configured to store a plurality of different fuels in pressurized, gaseous form. In one embodiment, the fuel tank may be adapted to store hydrogen at pressures in excess of 5000 pounds per square inch (p.s.i.). In this and other embodiments, the fuel tank may be further adapted to store compressed natural gas (CNG) at pressures in excess of 3600 p.s.i. The fuel tank may be configured to store the plurality of different fuels, simultaneously or sequentially, in the same internal cavity. Further, one or more sensors may be disposed in or on the fuel tank to enable at least an estimation of the amount of fuel contained therein. Accordingly, FIG. 1 shows fuel-tank pressure sensor 14 and fuel-tank temperature sensor 16, each coupled to the fuel tank. The fuel-tank pressure sensor may be any sensor responsive to a pressure of a gas contained within the fuel tank—either a relative pressure measured with respect to atmosphere, or an absolute pressure measured with respect to vacuum. The fuel-tank temperature sensor may be any sensor responsive to a temperature of the gas inside the fuel tank.

As shown in FIG. 1, fuel-tank pressure sensor 14 and fuel-tank temperature sensor 16 are operatively coupled to electronic control system 18, which may be any electronic control system of the fuel system or of the motor vehicle in which the fuel system is installed. The electronic control system may be configured to function at a lower level during a first set of operating conditions and at a higher level during a second set of operating conditions. For example, the lower level of functioning may provide basic monitoring and threshold comparison for or more sensor inputs to the electronic control system. The higher level of functioning may provide the functioning of the lower level in addition to various higher-level computations, interaction with other system components, and decision making. In some embodiments, the lower level of functioning may consume less power from a motor-vehicle battery (not shown) than the higher level of functioning. In some embodiments, electronic control system 18 may be maintained at the higher level of functioning when the engine is turned on, and may return to the lower level of functioning when the engine is turned off. Further, the electronic control system may be roused into the higher level of functioning when one or more sensor inputs indicate that the motor vehicle is being refueled. To provide a lower level and a higher level of functioning, the electronic control system may comprise a plurality of subsystems, with one or more of the subsystems remaining inactive during the lower level of functioning but becoming active during the higher level of functioning.

As shown in FIG. 1, electronic control system 18 includes memory 20. Memory 20 may be any non-volatile electronic memory. The memory may be adapted to store virtually any data relevant to the operation of the electronic control system. Such data may include, for example, a tally of the fuels present in fuel tank 12. The tally may be written into the memory by the electronic control system based on computations and determinations made therein, as described in further detail below.

FIG. 1 also shows first fuel port 22 and second fuel port 24. The first and second fuel ports may each be configured to admit a fuel into fuel system 10. Accordingly, the first and second fuel ports may each comprise one or more fixtures and/or fittings switchably couplable to a fuel supply line external to the fuel system. Industry standards may establish the type of fixture or fitting (viz., the configuration, dimensions, and/or materials thereof) through which a particular type of fuel may be supplied to a motor-vehicle fuel system. Thus, first fuel port 22 may be configured to mate with an industry-standard first supply line 22' providing a first type of fuel, and second fuel port 24 may be configured to mate with an industry-standard second supply line 24' providing a second type of fuel. Further, in some examples, the fixtures and/or fittings of the first fuel port may be incompatible with the supply line providing the second fuel and/or other fuels, and the fixtures and/or fittings of the second fuel port may be incompatible with the supply line providing the first fuel and/or other fuels. In this manner, the risk of accidentally admitting an unsuitable fuel to the fuel system via the first and second fuel ports may be reduced.

Industry standards may further establish an acceptable range of pressures at which the first and second fuels are supplied by first and second supply lines 22' and 24', respectively. In one embodiment, hydrogen may be supplied by the first supply line at a pressure of approximately 5000 p.s.i., and CNG may be supplied by the second supply line at a pressure of approximately 3600 p.s.i. It will be understood, however, that the pressures indicated herein are examples only, as other suitable pressures and pressure ranges are contemplated as well.

Continuing in FIG. 1, first fuel port 22 and second fuel port 24 may each comprise a closure that opens to admit one or more of a fuel and a supply line providing the fuel. Further, each closure may include a breech sensor responsive to whether the closure is in a breeched state. In one example, the breech sensor may include a switch that opens an electrical or optical circuit when the closure is breeched and closes the circuit when the closure is not breeched. Accordingly, FIG. 1 shows first closure 26 and first breech sensor 28, each coupled to first fuel port 22. FIG. 1 also shows second closure 30 and second breech sensor 32, each coupled to second fuel port 24. The first and second breech sensors may be operatively coupled to electronic control system 18 via appropriate cabling and/or optics.

FIG. 1 shows first fuel temperature sensor 34 coupled between first fuel port 22 and first closure 26, and second fuel temperature sensor 36 coupled between second fuel port 24 and second closure 30. Each of the first and second fuel temperature sensors may be any sensor responsive to a temperature of the gas flowing between a fuel port of fuel system 10 and its respective closure. As shown in FIG. 1, each of the first and second fuel temperature sensors is operatively coupled to electronic control system 18.

The example configuration described above enables various methods for registering a content change in a fuel system of a motor vehicle, which are illustrated later in this disclosure. Such methods may be refined, however, when certain other motor-vehicle sensors are also coupled to electronic control system 18. Accordingly, FIG. 1 shows a set of motor-vehicle sensors 38 operatively coupled to electronic control system 18. The set of motor-vehicle sensors may include any sensor responsive to an operating condition of a motor-vehicle engine or exhaust system (not shown in the drawings). The set of motor-vehicle sensors may include, for example, a coolant-temperature sensor, an air-intake mass-flow rate sensor, an exhaust-stream oxygen or air-fuel ratio sensor, or any combination thereof. In one embodiment, the tally of the amounts of each fuel present in fuel tank 12 may be refined during certain operating conditions of the motor vehicle. For example, given an air-intake rate determined by a throttle position known to the electronic control system, or to the response of an air-intake mass-flow rate sensor, the electronic control system may be configured to continuously adjust a fuel-injection rate such that the output of an exhaust-stream air-fuel ratio sensor is maintained near stoichiometric. From the ratio of the air-intake rate and the fuel-injection rate so provided, the electronic control system may evaluate and reevaluate the per-unit-volume reducing capacity of the fuel, and thereby identify the fuel mixture being supplied to the engine, if the mixture contain at most two components.

FIG. 1 shows fuel conduit 40 coupling fuel tank 12 to fuel-pressure regulator 42. The fuel pressure regulator is coupled to fuel injector 44 via fuel rail 46. The fuel pressure regulator may be any device configured to regulate a pressure of fuel supplied to the fuel rail and one or more fuel injectors.

In the illustrated embodiment, the section of fuel system 10 from fuel conduit 40 to fuel injector 44 is configured to be purgable in response to a control signal from electronic control system 18. As further described hereinafter, this feature may be used to sweep fuel of unknown or inadequately known composition from the indicated section of the fuel system in the event that the fuel admitted during a refill changes the composition in the fuel tank so significantly that a change in one or more operating parameters is warranted (e.g., the composition changes by more than a threshold amount). Due to the pressurized nature of the gaseous fuel, the unknown or inadequately known composition of fuel may be directed to the adsorbent canister by opening a passageway to enable the gaseous fuel to flow to the canister, including during engine off conditions such as during a fuel refill event. When the purging of the indicated section of the fuel system is enacted, the fuel is admitted to adsorbent canister 48, where it is trapped within a high-surface area adsorbent material. At the command of the electronic control system, the fuel may later be purged (e.g., after engine starting, such as during higher load conditions) from the adsorbent canister into intake manifold 50, as fresh air is drawn through the adsorbent canister. The purging may be carried out over several purge cycles, or may be completed in a single purging operation, depending on the amount of fuel stored in the adsorbent canister 48.

Figure 2:
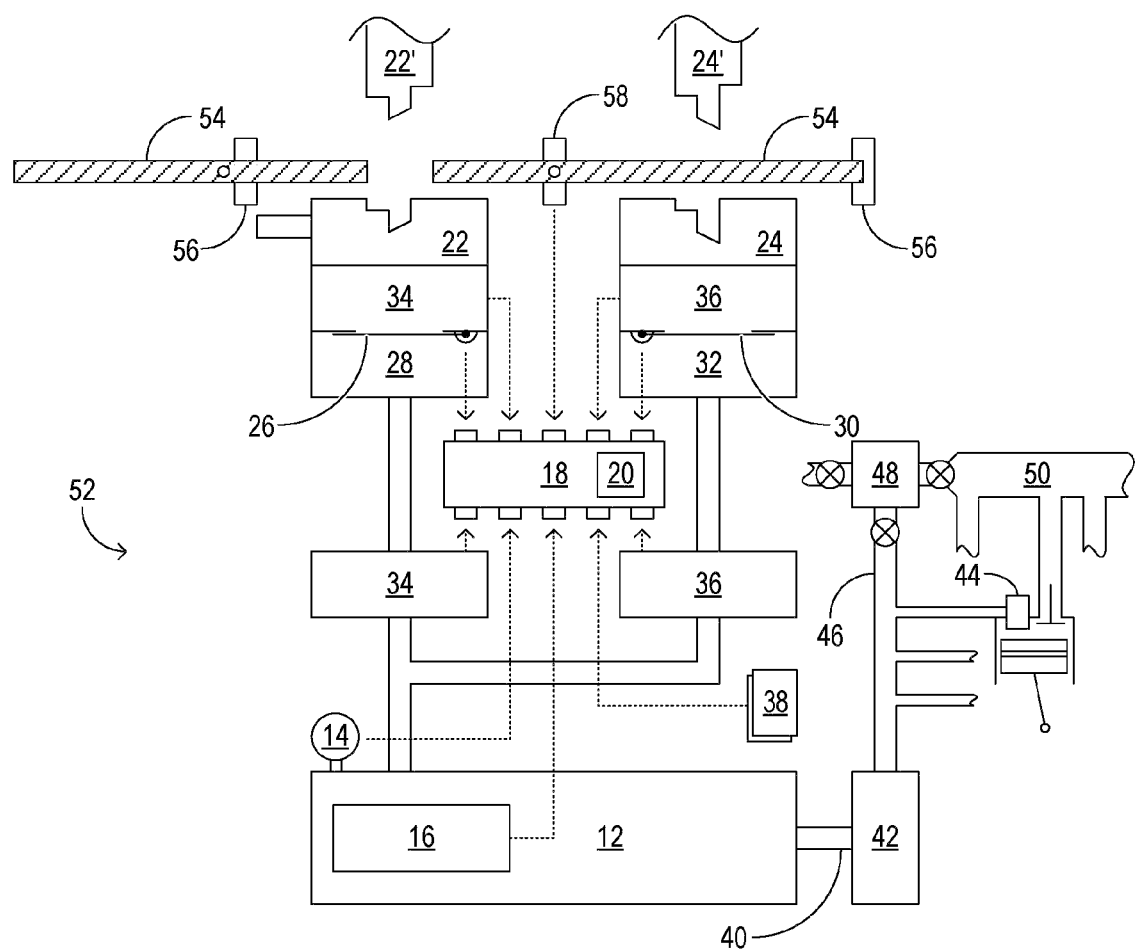
FIG. 2 schematically shows aspects of a second example fuel system configured to register a content change responsive to refueling, in accordance with the present disclosure.

FIG. 2 schematically shows aspects of another example fuel system 52 configured to register a content change responsive to refueling. Components of fuel system 52 that may be substantially the same as those of fuel system 10 are identified in the same way and are described no further. It will be noted, however, that components identified in the same way in different embodiments of the present disclosure may be at least partly different.

FIG. 2 shows fuel door 54 slideably coupled to bearing 56. The fuel door may be configured to slide between at least two positions on the bearing: a first position in registry with first fuel port 22, and a second position in registry with second fuel port 24. FIG. 2 shows position sensor 58 operatively coupled to electronic control system 18. The position sensor may be any sensor responsive to the position of the fuel door. The position sensor may comprise an electrical or optical switch, for example.

It will be evident that the configurations illustrated above enable various methods for registering a content change in a fuel system of a motor vehicle. Some such methods are described hereinafter, by way of example. It will be understood, however, that the example methods may be enabled via other configurations as well.

Figure 3:
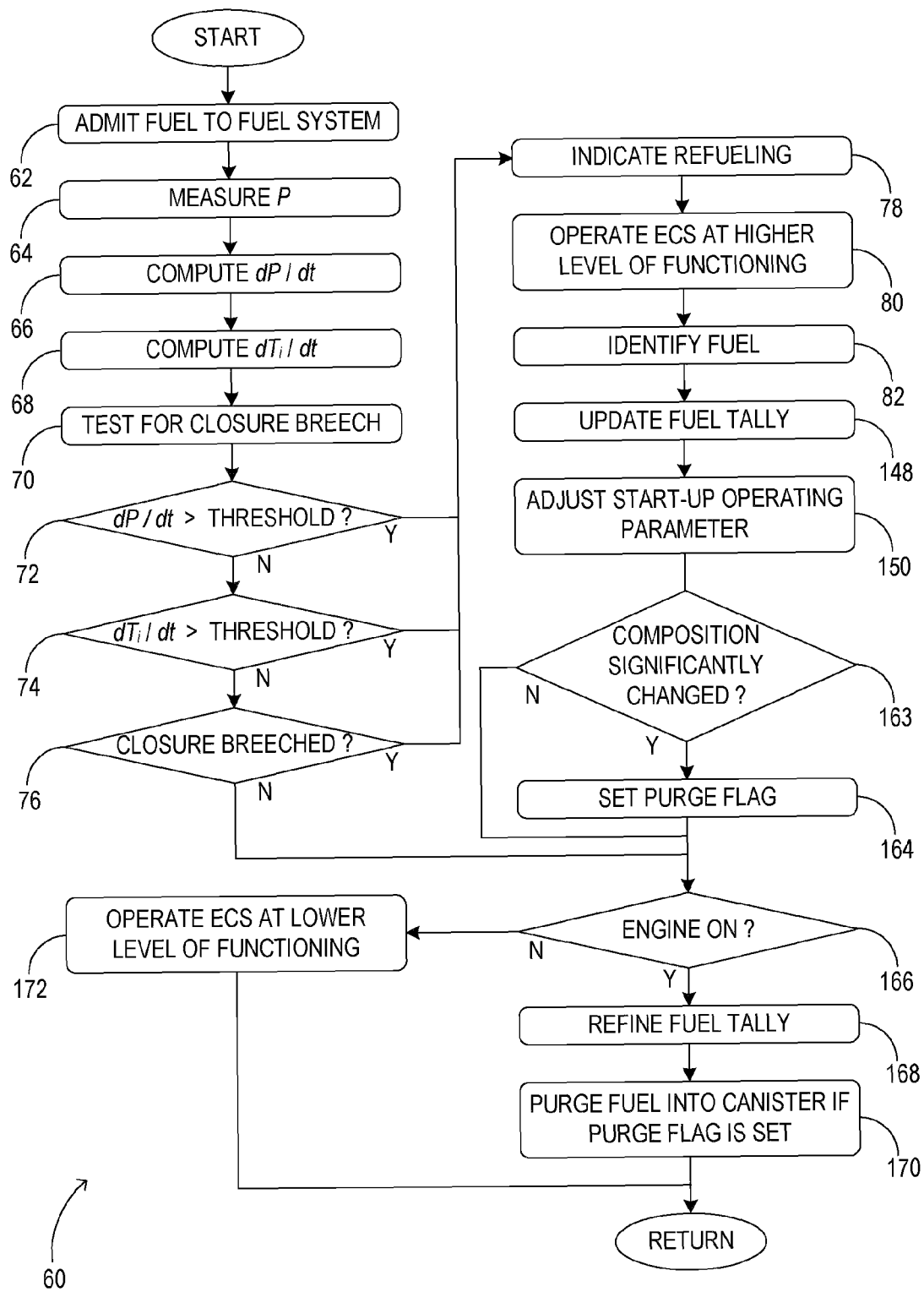
FIG. 3 illustrates an example method for registering a content change in a fuel system of a motor vehicle in accordance with the present disclosure.

FIG. 3 illustrates an example method 60 for registering a content change in a fuel system of a motor vehicle in which the fuel system is configured to receive a first fuel and a second fuel into a common space, such as a fuel tank. In the example method and related methods, a first condition is correlated to receiving the first fuel, and a second condition is correlated to receiving the second fuel.

The illustrated method includes various computation, comparison, and decision-making actions, which may be enacted via an electronic control system of a fuel system (e.g., fuel system 10 or 52, above) or of the motor vehicle in which the fuel system is installed. The method further includes various measuring and/or sensing actions that may be enacted via one or more sensors disposed in the fuel system (pressure sensors, temperature sensors, breech sensors, etc.), which are operatively coupled to the electronic control system, as described in the example configurations hereinabove.

Method 60 begins at 62, where fuel is admitted to the fuel system via a fuel port. The admission of fuel may be detected by an electronic control system, which interrogates one or more sensors operatively coupled to the electronic control system. An example series of interrogation steps begins at 64, where the fuel-tank pressure (P) is measured, and advances to 66, where the rate of change of the fuel-tank pressure (dP/dt) is computed. The fuel-tank pressure may be measured via a fuel-tank pressure sensor as shown in the configurations above, and the rate of change of the fuel-tank pressure may be computed via the electronic control system. Any suitable analog differentiating circuit or digital algorithm may be used in the electronic control system for computing the rate of change of the fuel-tank pressure.

Method 60 advances to 68, where the rate of temperature change ($dT_s/dt$) at one or more locations in the fuel system is computed. Rates of temperature change may be computed via one or more temperature sensors disposed in the fuel system, operatively coupled to an electronic control system, as shown in the example configurations hereinabove. Any suitable analog differentiating circuit or digital algorithm may be used at the electronic control system for computing the one or more rates of temperature change.

Method 60 advances to 70, where it is determined whether one or more fuel-port closures in the fuel system is breeched. A breech of the one or more fuel-port closures may be determined by an electronic control system that interrogates one or more breech sensors disposed at the fuel ports of the fuel system, as shown in the example configurations hereinabove.

Method 60 advances to 72, where it is determined whether the rate of change of the fuel tank pressure exceeds a predetermined threshold. If the rate of change of the fuel-tank pressure does not exceed the predetermined threshold, then the method advances to 74, where it is determined whether a rate of temperature change at one or more locations in the fuel system has exceeded a corresponding, predetermined threshold. If a rate of temperature change has not exceeded a corresponding, predetermined threshold at any of the any of the one or more locations in the fuel system, then the method advances to 76, where it is determined if any of the one or more fuel-port closures in the fuel system is breeched. In this example, a positive evaluation at 72, 74, or 76 may alert the electronic control system that fuel has been admitted to the fuel system. Therefore, if any of the one or more fuel-port closures is breeched, or if a rate of temperature change at one or more locations in the fuel system has exceeded a corresponding, predetermined threshold, or if the rate of change of fuel-tank pressure exceeds a predetermined threshold, then the method advances to 78, where it is indicated that the fuel system is being refueled, and to 80, where the electronic control system is operated at a higher level of functioning.

Depending on the pre-existing state of the electronic control system, the action taken at 80 may include maintaining the electronic control system in a pre-existing higher level of functioning or rousing the electronic control system into the higher level of functioning. In this example, the higher level of functioning may enable the electronic control system to monitor (or more actively monitor) one or more conditions responsive to the admission of fuel into the fuel system—a temperature or pressure change, for example—and thereby determine which fuel is being admitted. In this manner, the one or more conditions responsive to the admission of fuel may be monitored in response to an indication that fuel is being admitted to the fuel system.

Method 60 then advances to 82, where the fuel admitted to the fuel system is identified from among two or more different fuels. The identification of the fuel may be based on matching one or more conditions responsive to admitting the fuel to conditions correlated to receiving a first fuel or conditions correlated to receiving a second fuel. For example, it may be indicated that a first fuel, e.g., hydrogen, has been admitted to the fuel system if a condition responsive to admitting the fuel matches a first condition correlated to receiving the first fuel, and does not match a second condition correlated to receiving a second fuel, e.g., compressed natural gas. In some embodiments, the method may further comprise indicating that the second fuel has been admitted if the condition responsive to admitting the fuel matches the second condition and does not match the first condition. FIGS. 4-8 provide more specific example methods for identifying the fuel admitted to the fuel system.

Figure 4:
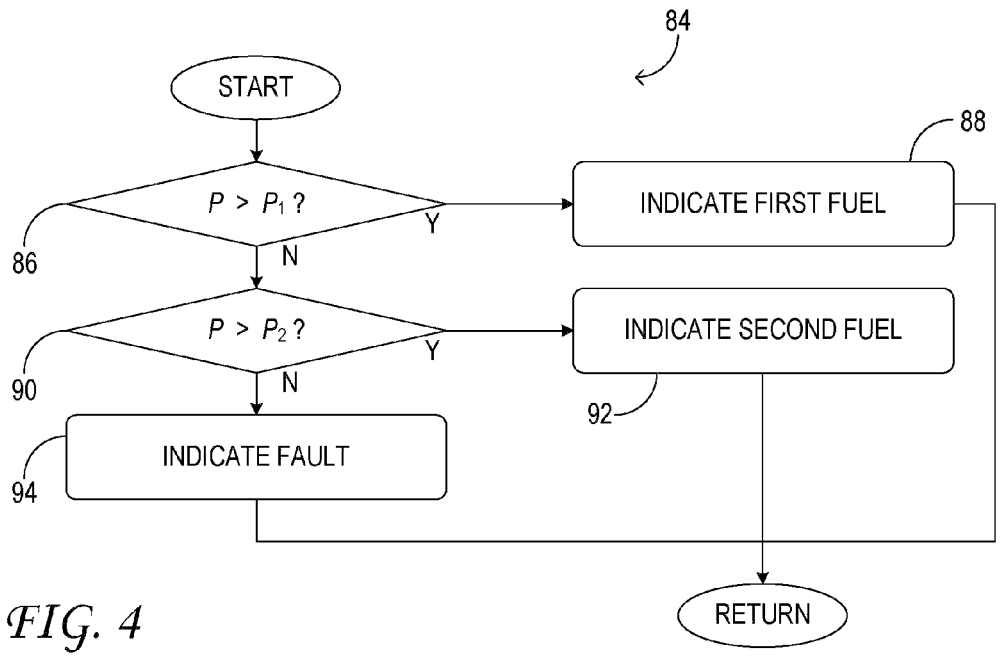
FIGS. 4-8 illustrate example methods for identifying which fuel has been admitted to a fuel system of a motor vehicle in accordance with the present disclosure.

FIG. 4 illustrates a first example method 84 for identifying which fuel has been admitted to a fuel system of a motor vehicle. In this example, the condition responsive to admitting the fuel is the maximum pressure of fuel that develops in the fuel system after the fuel has been admitted. The method begins at 86, where the pressure P in the fuel tank is compared to an industry-standard supply pressure $P_1$ of the first fuel—hydrogen, in one example. If the pressure is greater than or equal to the industry-standard supply pressure of the first fuel, then at 88, it is indicated that the first fuel was admitted. Otherwise, the method advances to 90, where the pressure is compared to an industry-standard supply pressure $P_2$ of the second fuel—CNG, in one example. If the pressure is greater than or equal to the industry-standard supply pressure of the second fuel, then at 92, it is determined that the second fuel was admitted to the fuel system. Otherwise, the method advances to 94, where the electronic control system indicates a fault. The fault may signify, for example, that the refueling was incomplete or that the identity of the fuel admitted to the fuel system was not identified. Following this action, or following the indications at 88 or 92, the method returns.

Figure 5:
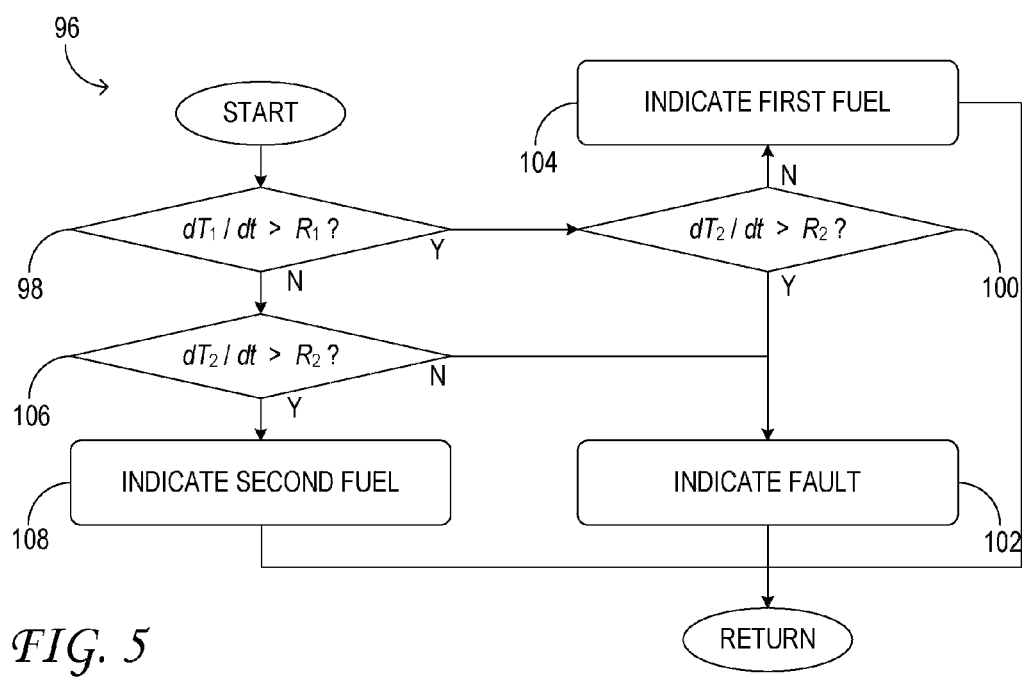

FIG. 5 illustrates a second example method 96 for identifying which fuel has been admitted to a fuel system of a motor vehicle. This method is based on the difference in the heat-capacity ratios ($c_p/c_v$) of the various contemplated gaseous fuels: methane at 1.299 and diatomic hydrogen at 1.409 at 298 Kelvin, for example. In this example, the condition responsive to admitting the fuel comprises one or both of a temperature change at a first fuel port of the fuel system and a temperature change at a second fuel port of the fuel system. The method begins at 98, where it is determined whether a rate of temperature change $dT_1/dt$ at the first fuel port exceeds a predetermined threshold $R_1$. If the rate of temperature change exceeds the predetermined threshold, then the method advances to 100, where it is determined whether a rate of temperature change $dT_2/dt$ at the second fuel port exceeds a predetermined threshold $R_2$. If the rate of temperature change exceeds the predetermined threshold, then at 102, a fault is indicated. The fault may signify, for example, that the identity of the fuel admitted to the fuel system was not identified. However, if the rate of temperature change exceeds the predetermined threshold for the first fuel port only, then at 104, it is indicated that the first fuel was admitted to the fuel system.

If it is determined at 98 that the rate of temperature change at the first fill port does not exceed the predetermined threshold, then the method advances to 106, where it is determined whether the rate of temperature change $dT_2/dt$ at the second fuel port exceeds a predetermined threshold $R_2$. If the rate of temperature change exceeds the predetermined threshold, then at 108, it is indicated that the second fuel was admitted to the fuel system. Following the indications at 102, 104, or 108, the method returns. In this example and others, the predetermined thresholds $R_1$ and $R_2$ may be computed based on the initial temperatures of the fuel admitted to the fuel tank and of the fuel initially present in the fuel tank.

Figure 6:
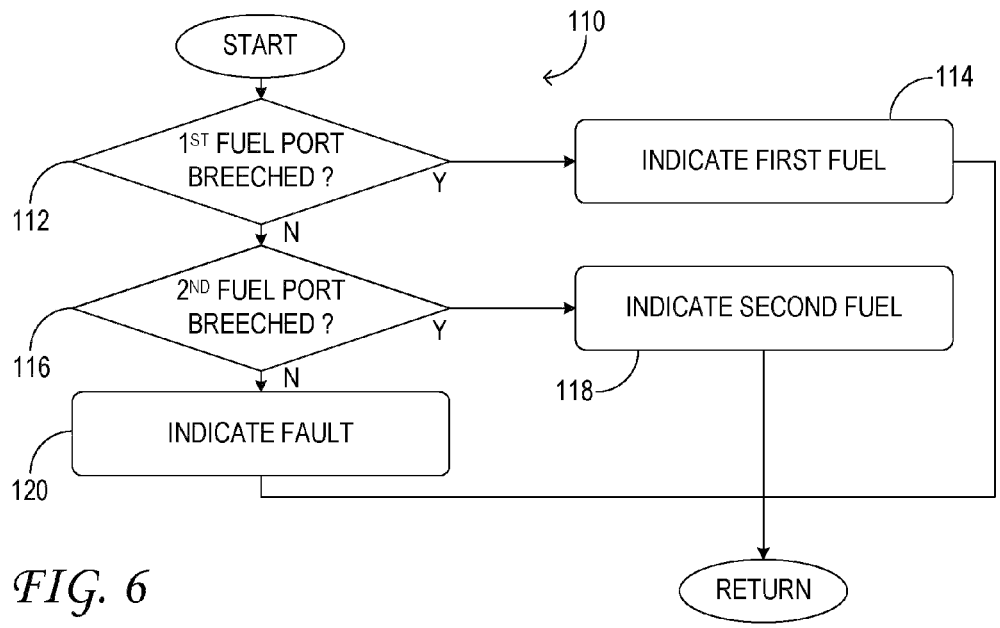

FIG. 6 illustrates a third example method 110 for identifying which fuel has been admitted to a fuel system of a motor vehicle. In this example, the condition responsive to admitting the fuel comprises whether a first fuel port or a second fuel port of the fuel system is breeched. The method begins at 112, where it is determined whether a closure of the first fuel port is breeched. If it is determined that the closure of the first fuel port is breeched, then at 114, it is indicated that the first fuel was admitted to the fuel system. Otherwise, the method advances to 116, where it is determined whether a closure of the second fuel port has been breeched. If it is determined that the closure of the second fuel port has been breeched, then at 118, it is indicated that the second fuel was admitted to the fuel system. Otherwise, the method advances to 120, where the electronic control system indicates a fault. The fault may signify, for example, that the fuel admitted to the fuel system was not identified. Following this action, or following the indications at 114 or 118, the method returns.

Figure 7:
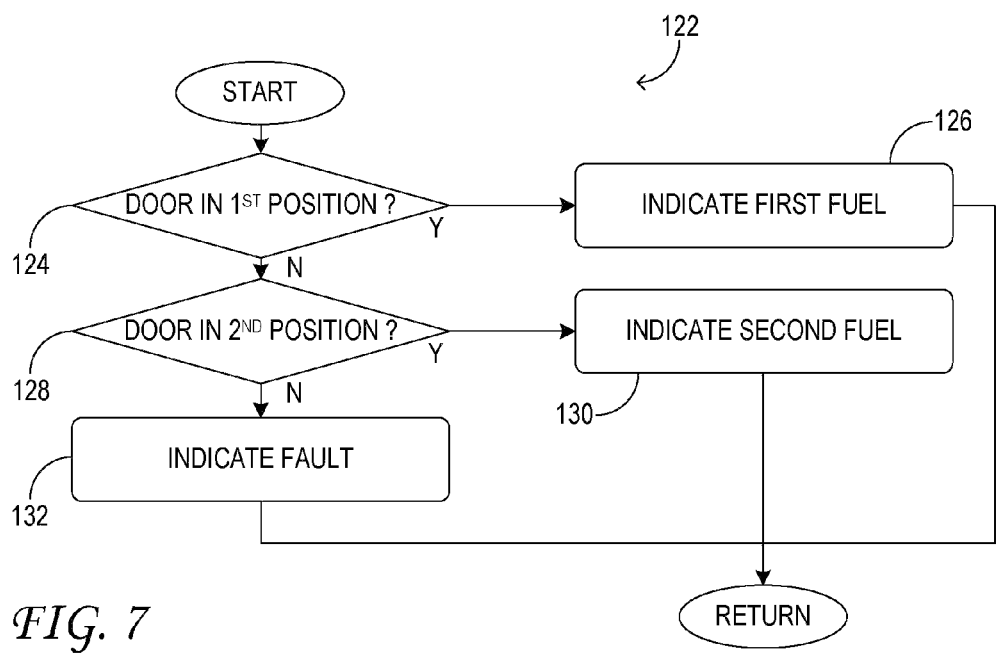

FIG. 7 illustrates a fourth example method 122 for identifying which fuel has been admitted to a fuel system of a motor vehicle. In this example, the condition responsive to admitting the fuel is a position of a fuel door. The method begins at 124, where it is determined whether a fuel door of the fuel system is in registry with a first fuel port. If it is determined that the fuel door is in registry with the first fuel port, then at 126, it is indicated that the first fuel was admitted to the fuel system. Otherwise, the method advances to 128, where it is determined whether the fuel door of the fuel system is in registry with the second fuel port. If it is determined that the fuel door is in registry with the second fuel port, then at 130, it is determined that the second fuel was admitted to the fuel system. Otherwise, the method advances to 132, where the electronic control system indicates a fault. The fault may signify, for example, that the fuel admitted to the fuel system was not identified. Following this action, or following the indications at 126 or 130, the method returns.

Figure 8:
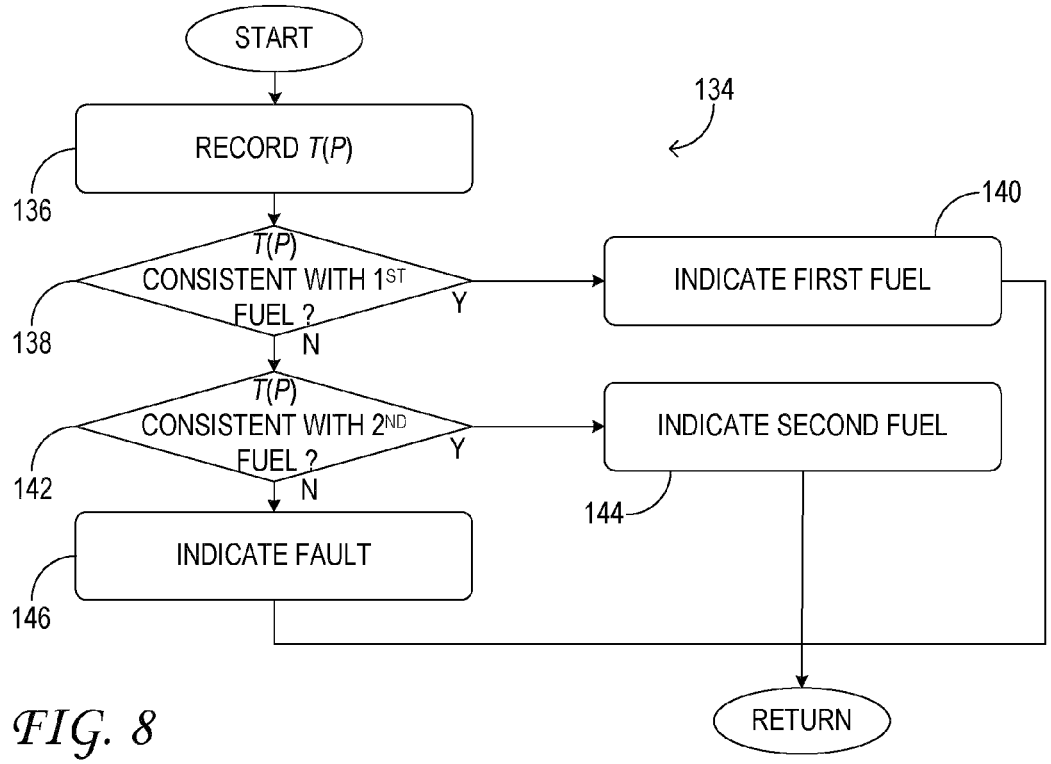

FIG. 8 illustrates a fifth example method 134 for identifying which fuel has been admitted to a fuel system of a motor vehicle. In this example, the condition responsive to admitting the fuel comprises a temperature change as a function of a pressure change in any fillable space of the fuel system, e.g., a fuel tank. The method begins at 136, where an evolving record of fuel-tank temperature as a function of pressure, T(P), is recorded. By repeatedly interrogating a fuel-tank pressure sensor and a fuel-tank temperature sensor at regularly spaced time intervals, an electronic control system of the motor vehicle may record the evolving record of fuel-tank temperature as a function of pressure and write the evolving record into memory. The method then advances to 138, where it is determined whether the evolving record of fuel-tank temperature as a function of pressure is consistent with the first fuel being admitted to the fuel system. The determination may be based on the predicted temperature increase in the fuel tank due to the adiabatic compression of the added fuel and the mixture already present in the fuel tank before refueling. If it is determined that T(P) is consistent with the first fuel being admitted to the fuel system, then at 140, it is indicated that the first fuel was admitted to the fuel system. Otherwise, the method advances to 142, where it is determined whether the evolving record of fuel-tank temperature as a function of pressure is consistent with the second fuel being admitted to the fuel system. The determination may be based on the predicted temperature increase in the fuel tank due to adiabatic compression, as described above. If it is determined that the evolving record of fuel-tank temperature as a function of pressure is consistent with the second fuel being admitted to the fuel system, then at 144, it is indicated that the second fuel was admitted to the fuel system. Otherwise, the method advances to 146, where the electronic control system indicates a fault. The fault may signify, for example, that the fuel admitted to the fuel system was not identified. Following this action, or following the indications at 138 or 142, the method returns.

The method illustrated above may be enacted with reference to a threshold temperature increase corresponding to a given pressure increase when a particular fuel is admitted to the fuel system. For example, in a fuel system configured to admit hydrogen and compressed natural gas, the compressed natural gas may release more heat than hydrogen for the same pressure increase. Therefore, one specific embodiment may comprise (at 136) measuring a temperature increase in the fuel tank after the pressure of fuel has increased by 100 p.s.i., and indicating (at 140) that compressed natural gas has been admitted if a temperature in the fuel tank increases by more than a threshold amount. In examples such as this, the threshold need not be a fixed threshold, but may be adjusted depending on various system parameters—temperature and pressure in the fuel tank before refueling, ambient temperature, etc.

Any of the methods illustrated in FIGS. 4-8 may be enacted independently of the others to provide an indication of fuel type. In other embodiments, however, any such method may be combined and coordinated with another for increased reliability. With method 84, for example, there is some chance that hydrogen, if supplied at a less than the expected 5000 p.s.i. supply pressure, would be mistaken for CNG. Therefore, method 84 may be coordinated with one or more other methods-method 134, for example. In such embodiments, indications of the various component methods may be processed via simple or fuzzy logic to yield a resultant indication of greater reliability than any of the individual, component methods.

Returning now to FIG. 3, method 60 advances to 148, where a fuel tally reflecting the various amounts of fuel stored in the fuel tank is updated. The tally may be updated based on a response of one or more sensors disposed in the fuel system and the indication provided at 82. For example, a tally of the amount of a first fuel in the fuel system may be updated based on the fuel-pressure increase recorded during the refueling and on an indication that the first fuel has been admitted.

Method 60 then advances to 150, where a start-up operating parameter of the motor vehicle is adjusted based on which fuel was admitted to the fuel system. In the various embodiments consistent with the present disclosure, the particular operating parameter adjusted may vary. For example, the start-up operating parameter may include a fuel injection amount, a fuel-injection pressure, a fuel-injection timing, and/or an ignition timing of an engine of the motor vehicle. As the appropriate start-up values for these and other operating parameters may differ depending on the composition of the fuel in the fuel system, the electronic control unit may be configured to provide an appropriate start-up value based on the stored tally. In one example, fuel injection timing may be advanced when the fuel comprises hydrogen and retarded when the fuel comprises compressed natural gas.

In an internal combustion engine, CNG may be run stoichiometric. Spark ignition timing may be advanced relative to gasoline to cope with the lower flame speed, as fuel enrichment for component protection may be less effective for gaseous fuels than for liquid fuels. In contrast, hydrogen may be run lean to control nitrogen oxide (NOX) emissions via lowering combustion temperatures. Here, spark ignition timing may be retarded relative to gasoline because of hydrogen's fast flame speed and reactivity. Further, hydrogen may require higher levels of boost than gasoline or CNG in turbocharged or supercharged engine systems to compensate for it low energy density.

Figure 9:
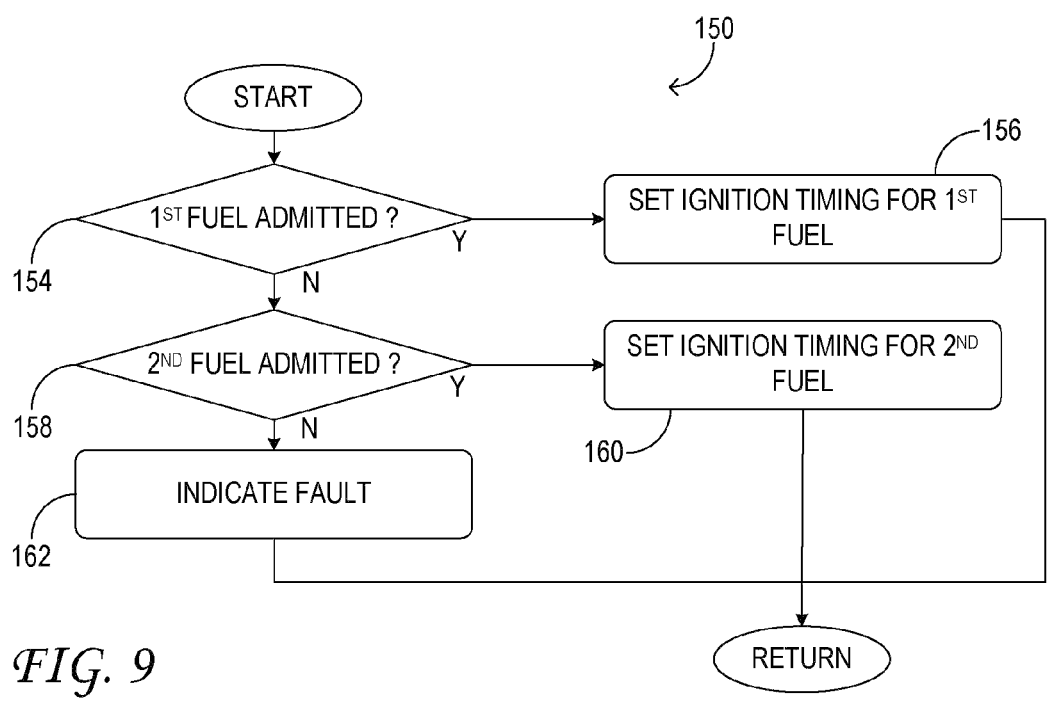
FIG. 9 illustrates an example method for adjusting a start-up operating parameter of a motor vehicle based on which fuel was admitted to the fuel system in accordance with the present disclosure.

FIG. 9 illustrates one specific example method 152 for adjusting a start-up operating parameter of a motor vehicle based on which fuel was admitted to the fuel system. The method begins at 154, where it is determined whether the first fuel was admitted to the fuel system. If it is determined that the first fuel was admitted to the fuel system, then the method advances to 156, where a fuel injection timing is made appropriate for the first fuel. However, if it is determined that the first fuel was not admitted to the fuel system, then the method advances to 158, where it is determined whether the second fuel was admitted to the fuel system. If it is determined that the second fuel was admitted to the fuel system, then the method advances to 160, where a fuel injection timing is made appropriate for the second fuel. However, if it is determined that the second fuel was not admitted to the fuel system, then a fault is generated. The fault may indicate, for example, that the electronic control system is unable to set the fuel injection timing based on the identity of the fuel admitted to the fuel system. Following this action, or following the fuel injection settings at 156 or 160, the method returns.

In the event that method 150 or another method returns a fault condition signaling that the composition of the fuel in the fuel tank is not adequately know, various remediation modes may be enacted. In one example, the electronic control system may provide fuel and air to the engine at systematically differing ratios in an effort to learn the fuel composition.

Returning now to FIG. 3, method 60 then advances to 163, where it is determined whether the refill event indicated at 78 has changed the composition of fuel in the fuel system by more than a threshold amount, such that one or more transient control issues could result. If it is determined that the composition has been changed by more than the threshold amount, then at 164, a purge flag is set in the electronic control system that will command the electronic control system to purge the fuel system from the pressure regulator to the fuel injector, as further described below.

After 164, or if it is determined at 163 that the refill event did not change the composition of fuel in the fuel system by more than the threshold amount, or if it is determined at 76 that no fuel-port closure of the fuel system is breeched, then method 60 advances to 166, where it is determined whether the engine of the motor vehicle is on. If the engine of the motor vehicle is on, then the method advances to 168, where the fuel tally is refined. The electronic control system may refine the fuel tally in a closed-loop manner based on a known air-intake amount, a known fuel-injection amount, and an exhaust-stream air-fuel ratio sensor response. For example, given some air-intake rate determined by throttle position, the electronic control system may be configured to continuously adjust a fuel injection rate such that the exhaust-stream air-fuel ratio is maintained near stoichiometric. From the ratio of the air-intake rate and the fuel-injection rate so provided, the electronic control system may evaluate and reevaluate the per-unit-volume reducing capacity of the fuel, and thereby identify the fuel mixture being supplied to the engine, if the mixture contains at most two components. In this manner, the tally may be refined based on a fuel injection amount and an air-flow amount at a stoichiometric condition of an engine system of the motor vehicle.

Method 60 then advances to 170, where pre-existing fuel from the pressure regulator to the fuel injector of the fuel system is purged into a fuel-system adsorbent if the aforementioned purge flag is set. Components purged may include the fuel-supply conduit, the fuel-pressure regulator, the fuel rail, and one or more fuel injectors. This action may limit fuel-composition uncertainty and related control difficulties when the fuel-composition change appears at the fuel injector. Such a remedy may be more advantageous and more practical in gas-fueled systems, where very little energy is stored energy in transit from the fuel tank to the injectors, in contrast to liquid-fueled systems. Moreover, the time lag between a composition change in the fuel tank and a corresponding change at the injector in a gas-fueled system is relatively short. In some embodiments, another fuel (e.g., a liquid fuel) may be supplied to the engine during this period.

It will be understood that the foregoing example provides only one of many contemplated embodiments wherein the fuel admitted to the fuel system is identified before the fuel is consumed by an engine of the motor vehicle, and before any combustion property of the fuel in the fuel system is otherwise manifest. In such examples, one or more combustion properties of the fuel present in the fuel system may be used to refine the fuel tally, but after the admitted fuel has been independently identified. Likewise, the foregoing examples provide that the start-up operating parameter is adjusted before any fuel is consumed by the engine or any combustion property of the fuel is manifest.

Returning now to FIG. 3, if it is determined at 166 that the engine is off, then at 172, the electronic control system is operated at a lower level of functioning. Depending on the pre-existing state of the electronic control system, the action taken at 172 may include maintaining the electronic control system in a pre-existing lower level of functioning or calming the electronic control system into the lower level of functioning. After 168 or 172, method 60 returns.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for registering a content change in a fuel system of a motor vehicle, the method comprising:
   admitting fuel to the fuel system, the fuel system configured to receive hydrogen and compressed natural gas into a common space;
   indicating that compressed natural gas has been admitted if a temperature in the common space increases by more than a threshold amount when the fuel is admitted, said indicating occurring, if at all, before the compressed natural gas is consumed by an engine of the motor vehicle;
   indicating that hydrogen has been admitted if the temperature in the common space increases by less than the threshold amount when the fuel is admitted, said indicating occurring, if at all before the hydrogen is consumed by the engine of the motor vehicle; and
   adjusting a start-up operating parameter of the motor vehicle in response to which of said fuels is indicated to have been admitted.

2. A method for registering a content change in a fuel system of a motor vehicle, the method comprising:
   admitting fuel to the fuel system, the fuel system configured to receive a first fuel and a second fuel into a common space, where a first condition is correlated to receiving the first fuel, and a second condition is correlated to receiving the second fuel;
   indicating that the first fuel has been admitted if a condition responsive to admitting the fuel matches the first condition and does not match the second condition; and
   adjusting a start-up operating parameter of the motor vehicle in response to indicating that the first fuel has been admitted.

3. The method of claim 2, wherein the start-up operating parameter is one or more of a fuel injection amount, a fuel-injection pressure, a fuel-injection timing, and an ignition timing of an engine of the motor vehicle.

4. The method of claim 2, further comprising manifesting a combustion property of the fuel admitted to the fuel system, wherein the start-up operating parameter is adjusted before the combustion property is manifest.

5. The method of claim 2, further comprising purging a pre-existing fuel from one or more of a fuel-supply conduit, a fuel-pressure regulator, a fuel rail, and a fuel injector into a fuel-system adsorbent in response to a changing composition of fuel in the fuel system.

6. A method for registering a content change in a fuel system of a motor vehicle, the method comprising:
   admitting fuel to the fuel system, the fuel system configured to receive a first fuel and a second fuel into a common space, where a first condition is correlated to receiving the first fuel, and a second condition is correlated to receiving the second fuel; and
   indicating that the first fuel has been admitted if a condition responsive to admitting the fuel matches the first condition and does not match the second condition.

7. The method of claim 1, further comprising indicating that the second fuel has been admitted if the condition responsive to admitting the fuel matches the second condition and does not match the first condition.

8. The method of claim 1, wherein the condition responsive to admitting the fuel is monitored in response to admitting the fuel.

9. The method of claim 1, where the condition responsive to admitting the fuel comprises a temperature change as a function of a pressure change in the common space, where the first condition comprises a first temperature change, and the second condition comprises a second temperature change, and where the second temperature change is larger than the first temperature change for the same pressure change.

10. The method of claim 1, where the condition responsive to admitting the fuel comprises a position of a fuel door, where the fuel door is in registry with a first fuel port in the first condition, and the fuel door is in registry with a second fuel port in the second condition.

11. The method of claim 1, where the condition responsive to admitting the fuel comprises whether a first fuel port or a second fuel port of the fuel system is breeched, where in the first condition the first fuel port is breeched, and in the second condition the second fuel port is breeched.

12. The method of claim 1, where the condition responsive to admitting the fuel comprises one or both of a temperature change at a first fuel port of the fuel system and a temperature change at a second fuel port of the fuel system, where the first condition comprises an above-threshold temperature change at the first fuel port, and the second condition comprises an above-threshold temperature change at the second fuel port.

13. The method of claim 1, where the condition responsive to admitting the fuel comprises a pressure of fuel in the common space, where the first condition comprises a first supply pressure in the common space, and the second condition comprises a second supply pressure, higher than the first supply pressure, in the common space.

14. The method of claim 1, where the first fuel comprises hydrogen, and the second fuel comprises compressed natural gas.

15. The method of claim 1, wherein indicating that the first fuel has been admitted occurs before the fuel is consumed by an engine of the motor vehicle.

16. The method of claim 1, further comprising measuring a fuel-pressure increase in the common space in response to admitting the fuel.

17. The method of claim 16, further comprising updating a tally of an amount of the first fuel in the fuel system based on the fuel-pressure increase and on an indication that the first fuel has been admitted.

18. The method of claim 17, further comprising refining the tally based on a fuel injection amount and an air-flow amount at a stoichiometric condition of an engine system of the motor vehicle.

19. The method of claim 1 further comprising adjusting a start-up operating parameter of the motor vehicle in response to indicating that the first fuel has been admitted.

20. The method of claim 19, wherein the start-up operating parameter is one or more of a fuel injection amount, a fuel-injection pressure, a fuel-injection timing, and an ignition timing of an engine of the motor vehicle.

21. The method of claim 19, further comprising manifesting a combustion property of the fuel admitted to the fuel system, wherein the start-up operating parameter is adjusted before the combustion property is manifest.

* * * * *